May 23, 1961     I. D. SMITH     2,985,443

LIQUID SPRING

Filed March 31, 1958

INVENTOR.
IRA D. SMITH
BY

ATTORNEY

United States Patent Office 2,985,443
Patented May 23, 1961

2,985,443

LIQUID SPRING

Ira D. Smith, Bedford, Ohio, assignor to Cleveland Pneumatic Industries, Inc., Cleveland, Ohio, a corporation of Ohio Filed Mar. 31, 1958, Ser. No. 725,210

1 Claim. (Cl. 267—1)

This invention relates generally to liquid springs and more particularly to a new and improved double acting liquid spring.

It is an important object of this invention to provide a liquid spring which is capable of resiliently resisting both tension and compression forces.

It is another important object of this invention to provide a double acting liquid spring which is resiliently maintained in a static position but is operable to permit movement in both directions from the static position.

It is another object of this invention to provide a new and improved double acting liquid spring incorporating damping means which resist motion of the liquid spring in both directions from a normal static position.

It is another important object of this invention to provide a new and improved liquid spring incorporating two opposed plungers having differential areas in combination with stop means to prevent separation of the plungers beyond a predetermined position.

Further objects and advantages will appear from the following description and drawings, wherein.

Figure 1:
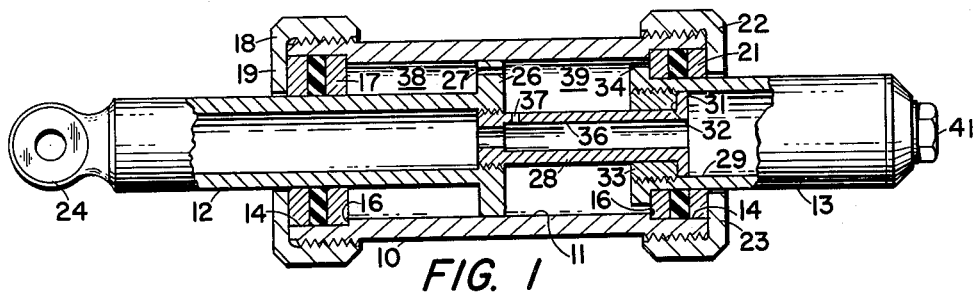
Figure 1 is a side elevation in longitudinal section of a preferred double acting liquid spring according to this invention incorporating damping means to resist movement of the spring in both directions from the normal static position with the elements shown in the static position.

A liquid spring incorporating this invention is resiliently urged toward a center or static position and is capable of resiliently resisting motion in both directions from the static position. Referring to the drawing, the liquid spring includes a cylinder 10 formed with a through bore 11. A first plunger 12 projects into the left end of the bore 11 and a second plunger 13 projects into the right end. The cylinder 10 is formed with counter bores 14 adjacent to its ends which terminate in shoulders 16. A first gland or seal assembly 17 is positioned in the left hand counter bore 14 and extends between the cylinder 10 and the first plunger 12 and provides a fluid seal therebetween. To secure the gland assembly 17 in position, I provide an end cap 18 threaded onto the cylinder 10 and provided with an apertured end wall 19 through which the plunger 12 projects. A second gland assembly 21 is positioned in the right hand counter bore 14 and extends between the cylinder 10 and the second plunger 13 providing the fluid seal therebetween. Here again, an end cap 22 is threaded onto the cylinder 10 and is provided with an apertured end wall 23 through which the plunger 13 projects. In both cases, the end caps 18 and 22 secure their associated gland assemblies 17 and 21 against the shoulders 16 so that the gland assemblies are axially located with respect to the cylinder 10. The gland assemblies 17 and 21 are preferably of the type described and claimed in the copending application of Arthur L. Lindow and Richard A. Graff, Serial No. 597,692, filed July 13, 1956, now Patent No. 2,960,332, issued November 15, 1960, and since the glands do not form any part of this invention, except insofar as they co-operate to produce a liquid spring, the structural details have not been shown and will not be discussed.

The outer end of the first plunger 12 is formed with a mounting lug 24 to which a load can be attached and the cylinder 10 can be mounted with any suitable means such as trunnions or the like. The inner end of the first plunger 12 is formed with a radial head portion 26 which extends into engagement with the wall of the bore 11. To provide damping which dynamically resists movement of the plungers, an orifice 27 is formed in the head portion 26 to provide a restricted flow connection between the two sides of the head portion. Threaded into the end of the first plunger 12 is a hollow extension member 28 which extends into an axial bore 29 formed in the second plunger 13. A radial shoulder 31 is formed on the end of the extension member 28 to provide a radial surface 32 engageable with a stop member 33 threaded into the inner end of the second plunger 13. Thus, the first plunger 12 can move axially to the right relative to the second plunger 13 beyond the position shown in Figure 1 but cannot move to the left beyond this position due to the engagement of the radial surface 32 with the stop member 33. The inner end of the second plunger 13 is formed with a radially extending flange 34 which is engageable with the gland assembly 21 to prevent movement of the second plunger 13 to the right beyond the position shown in Figures 1 and 3. The extension member 28 is formed with a through bore 36 which communicates with the portion of the spring around the extension member through a fluid passage 37.

Those skilled in the art will recognize that the cylinder 10, plungers 12 and 13, and seal assemblies 17 and 21 co-operate to define a cavity divided into first and second chambers 38 and 39 by the head portion 26. It should be understood that the portion of the cavity within the plungers 12 and 13 and the extension member 28 is considered part of the chamber 39. The plunger 12 is formed with a smaller cross-sectional area than the plunger 13 so when the spring is charged with liquid under pressure through a removable charging fitting 41, the reaction of the liquid under pressure will produce a larger force urging the plunger 13 to the right, than it will produce on the plunger 12, urging it to the left. Normally, liquid springs of this nature are precharged to a pressure in the order of 1,000 pounds per square inch so even when the device is in the static position of Figure 1, there will be a resilient force developed by the liquid contained therein tending to maintain the elements in this position.

In operation, if the first plunger 12 is moved to the right relative to the cylinder 10, it displaces a volume of liquid equal to the area of the plunger 12 within the gland assembly 17 times its axial displacement and this, of course, compresses the liquid contained within the spring. Conversely, when the plunger 13 moves to the left, it displaces a volume of liquid within the spring equal to the area of the plunger 13 within the gland assembly 21 times the stroke or axial movement of the plunger 13. In operation, if the first plunger 12 is pulled to the left by a tension force applied to the mounting lug 24, the engagement between the radial surface 32 and the stop member 33 causes the plunger 13 to also move to the left. When the plunger 12 moves to the left, it displaces less liquid within the spring so it tends to decrease the pressure of the liquid contained therein; however, the second plunger 13 is formed with a larger cross-sectional area so it displaces liquid at a greater rate and the net result is that the liquid contained within the spring is compressed. The resulting compression is determined by the difference between the cross-sectional area of the second plunger 13 and the first plunger 12 times the stroke of the two plungers which is, of course, equal. This is the condition shown in Figure 2 wherein the plunger 12 is moved to the left to its extreme position at which time the head portion 26 engages the left hand seal assembly 17. At this time, the volume of the first chamber 38 is reduced to substantially zero and the volume of the second chamber 39 is increased so fluid flows through the orifice 27 in the usual manner to provide damping which dynamically resists the movement of both the plungers. Of course, the pressure of the liquid contained within the spring is increased as the plungers are moved to the position of Figure 2 due to the compression of the liquid so an increased pressure force is developed urging the elements back to the static position of Figure 1.

Figure 2:
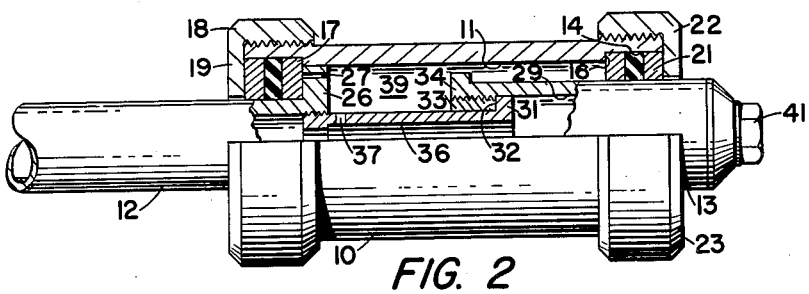
Figure 2 is a side elevation partially in longitudinal section of the spring shown in Figure 1 showing the positions the elements assume when the spring is moved by a tension force.
Figure 3:
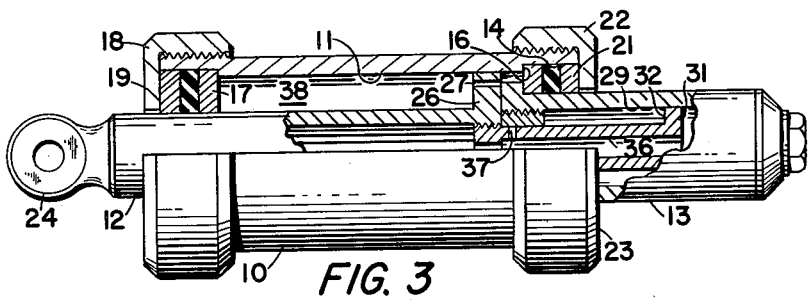
Figure 3 is a view similar to Figure 2 showing the positions the elements assume when the spring is compressed; and, Figure 4 is a side elevation and longitudinal section showing a second embodiment of a liquid spring according to this invention where damping is only provided to resist tension forces on the spring.

If a compression load is applied to the first plunger 12 urging it to the right relative to the cylinder 10 as shown in Figure 3, the second plunger 13 remains in its extended position due to the engagement of the flange 34 with the gland assembly 21 and the radial surface 32 moves out of engagement with the stop member 33. Because the second plunger 13 does not move relative to the cylinder 10, it does not change the displacement liquid contained within the spring when the plunger 12 moves to the right. However, the plunger 12 displaces liquid as described above, thus compressing the liquid and increasing the pressure thereof. As a result, the liquid produces a reaction force on the plunger 12 resiliently urging it to the left. Since the head portion 26 is formed on the first plunger 12, movement thereof to the compressed position of Figure 3 causes a reduction in the volume of the second chamber 39 and an increase in the volume of the first chamber 38 so the liquid is caused to flow through the orifice 27 to provide dynamic resistance to the plunger movement. Therefore, the spring shown in Figures 1 through 3 is provided with damping to dynamically resist movement of the plunger 12 caused by either tension or compressive loads.

If the spring is to be provided with a load stroke relationship wherein the same spring forces are developed to resist tension and compression forces, the first plunger 12 should have a cross-sectional area within the gland assembly 17 equal to one-half of the cross-sectional area of the plunger 13 within the gland assembly 21. However, if the tension reaction of the spring is to be greater than the compression reaction, the cross-sectional area of the plunger 12 should be less than one-half of the cross-sectional area of the plunger 13. In other words, the cross-sectional area of the plunger 12 determines the compression characteristics of the spring and the difference between the cross-sectional areas of the plunger 12 and the plunger 13 determines the tension characteristics.

Figure 4:
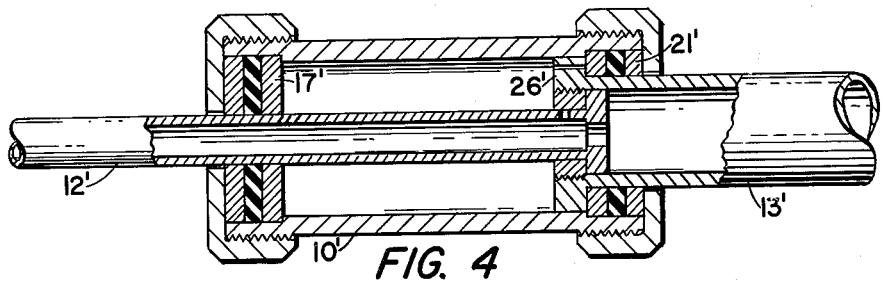

In the embodiment shown in Figure 4, similar numerals will be used to describe similar elements with a prime (') added to indicate that they refer to the second embodiment. In the spring of Figure 4, the cylinder 10' is provided with gland assemblies 17' and 21' which seal with the plungers 12' and 13' respectively. In this case, the head portion 26' is formed on the larger diameter plunger 13' so that damping is only provided to resist tension forces but is not provided to resist compression forces. This is because the right hand plunger 13' does not move when the left hand plunger 12' is subjected to compression loads which urge it to the right relative to the cylinder 10'. The right end of the plunger 13' is closed in the same manner as shown in Figure 1 and the left end of the plunger 12' would be closed even though these portions of the device are not shown. In this case, a given cylinder length will provide a spring having a longer stroke because the head portion 26' is able to move through the full distance between the gland assembly 17' and 21' when the plunger 12' is subjected to tension loads. Therefore, this structure has the advantage of allowing a longer stroke without increasing the axial length of the cylinder 10'. However, there is no damping provided when the plunger 12' moves under compression loads. Aside from this difference, the two springs function in the same manner.

Those skilled in the art will recognize that a spring, according to this invention, will function with a high degree of reliability because the mechanism is simple and economical to produce. However, a spring, according to this invention, is suitable for use whenever compression and tension forces are to be resiliently resisted.

Although preferred embodiments of this invention are illustrated, it will be realized that various modifications of the structural details may be made without departing from the mode of operation and the essence of the invention. Therefore, except insofar as they are claimed in the appended claim, structural details may be varied widely without modifying the mode of operation. Accordingly, the appended claim and not the aforesaid detailed description is determinative of the scope of the invention.

I claim:

A double acting liquid spring comprising an elongated cylinder, a first plunger extending into one end of said cylinder, a second plunger extending into the other end of said cylinder, a first seal mounted on said cylinder slidably engaging said first plunger, a second seal mounted on said cylinder slidably engaging said second plunger, said cylinder and seals cooperating with said first and second plungers to define a cavity completely filled with liquid, an inwardly extending shoulder on one of the said plungers, an outwardly extending flange on the other of said plungers, said shoulder and flange being engaged to effect movement of said second plunger inwardly of said cavity to reduce the volume thereof upon movement of said first plunger outward of said cavity, said first plunger being adapted to move inwardly of said cavity to reduce the volume thereof in response to compression forces applied thereto, the area of said second plunger within said second seal being larger than the area of said first plunger within said first seal, stop means on said second plunger preventing relative axial motion between said second plunger and cylinder beyond an extended position, piston head means on one of said plungers dividing said cavity into first and second chambers, a first passage in said piston head connecting said chambers through which liquid flows between said chambers upon movement of said first and second plungers in both directions relative to said cylinder, a liquid-filled bore in at least one of said plungers defining a second cavity the volume of which is changed by relative movement between said plungers and a second passage in one of said plungers through which fluid flows between one of said chambers and said second cavity only when said first plunger moves relative to said second plunger, the resistance to liquid flow through said passages resisting movement of said plungers.

References Cited in the file of this patent

UNITED STATES PATENTS

| | | |
|---|---|---|
| 2,064,527 | Ericsson | Dec. 15, 1936 |
| 2,614,833 | Laugaudin | Oct. 21, 1952 |
| 2,766,037 | Taylor | Oct. 9, 1956 |
| 2,771,968 | Mercier | Nov. 27, 1956 |
| 2,899,194 | Zumwalt | Aug. 11, 1959 |